United States Patent
Liang et al.

(10) Patent No.: US 12,281,260 B2
(45) Date of Patent: Apr. 22, 2025

(54) WELLBORE TREATMENT FLUIDS COMPRISING AN AMPHIPHILIC HYPERBRANCHED COPOLYMER

(71) Applicants: Saudi Arabian Oil Company, Dhahran (SA); Case Western Reserve University, Cleveland, OH (US)

(72) Inventors: Feng Liang, Cypress, TX (US); Hui-Hai Liu, Katy, TX (US); Jin Ge, Cleveland, OH (US); Jose I. Rueda, Dhahran (SA); Mohammed A. Bataweel, Dhahran (SA)

(73) Assignees: Saudi Arabian Oil Company, Dhahran (SA); Case Western Reserve University, Cleveland, OH (US)

( * ) Notice: Subject to any disclaimer, the term of this patent is extended or adjusted under 35 U.S.C. 154(b) by 0 days.

(21) Appl. No.: 18/340,357

(22) Filed: Jun. 23, 2023

(65) Prior Publication Data

US 2024/0425747 A1  Dec. 26, 2024

(51) Int. Cl.
| | | |
|---|---|---|
| *C09K 8/60* | (2006.01) | |
| *E21B 43/16* | (2006.01) | |
| *E21B 43/26* | (2006.01) | |

(52) U.S. Cl.
CPC .............. *C09K 8/602* (2013.01); *E21B 43/16* (2013.01); *E21B 43/26* (2013.01)

(58) Field of Classification Search
CPC .......... C09K 8/602; E21B 43/26; E21B 43/16
See application file for complete search history.

(56) References Cited

U.S. PATENT DOCUMENTS

| | | | |
|---|---|---|---|
| 2006/0128598 A1* | 6/2006 | Chen .................... | C09K 8/68 |
| | | | 510/490 |
| 2012/0178835 A1 | 7/2012 | Findlay et al. | |
| 2018/0230355 A1* | 8/2018 | Zha .................... | C09K 8/12 |
| 2018/0325820 A1* | 11/2018 | Matyjaszewski ...... | A61K 9/146 |
| 2019/0106524 A1* | 4/2019 | Yamago .................... | C08F 4/42 |
| 2021/0253942 A1* | 8/2021 | Russum .................... | C09K 8/74 |
| 2022/0186179 A1* | 6/2022 | Mueller ................ | C12N 5/0081 |
| 2022/0251439 A1* | 8/2022 | Shanmugam .......... | C09K 8/035 |
| 2022/0267571 A1* | 8/2022 | Fihri .................... | C08K 7/10 |

OTHER PUBLICATIONS

Yang et al., "Synthesis of two AMPS-based polymerizable room temperature ionic liquids and swelling difference between their co-polymeric gels with HEMA", e-Polymers, vol. 14, No. 5, pp. 335-343, 2014.

Zheng et al., "Hyperbranched polymers: advances from synthesis to appliactions", Royal Society of Chemistry, vol. 44, pp. 4041-4130, 2015.

* cited by examiner

*Primary Examiner* — Silvana C Runyan
(74) *Attorney, Agent, or Firm* — DINSMORE & SHOHL LLP (57) ABSTRACT

Wellbore treatment fluids are provided that include an aqueous component and an amphiphilic hyperbranched copolymer comprising the polymerized reaction product of at least a first monomer and a second monomer, where the first monomer comprises at least one surface reactive end group chosen from the group consisting of carboxylates, phosphonates, sulfonates, and zwitterions. Also provided are methods of modifying subsurface energy of a carbonate formation using the wellbore treatment fluids.

17 Claims, 4 Drawing Sheets

WELLBORE TREATMENT FLUIDS COMPRISING AN AMPHIPHILIC HYPERBRANCHED COPOLYMER

TECHNICAL FIELD

Embodiments of the present disclosure generally relate to compositions and methods for improving fracture conductivity resulting from hydraulic fracturing and, more specifically, to wellbore treatment fluids that form a protective coating on a formation surface that serves to limit the surface's interaction with aqueous-based fluids during hydraulic fracturing.

BACKGROUND

Hydraulic fracturing has been widely adopted as a method for stimulating and enhancing the production of hydrocarbons in oil and gas wells. Hydraulic fracturing typically includes at least two stages: a pad stage and a slurry stage. To prepare for hydraulic fracturing, targeted segments of casing are perforated so that fracturing fluid can access the desired formation zones. A pre-pad stage may follow, where a dilute acid solution is sent down the well to clean out debris and cement around the perforations. In the subsequent pad stage, a water-based fracturing fluid is pumped into the well and through the perforations at a high enough pressure to generate and propagate fractures in the desired formation zones, thereby creating a fracture matrix. The fracturing fluid in the pad stage does not include proppants. In the slurry stage, while maintaining the high pressure of the pad stage, a slurry fluid comprising proppants is injected. The proppants, which remain in the formation once the pressure is reduced, "prop" the fracture apertures open to provide a conductive path for hydrocarbons from the formation to flow into the wellbore.

Although hydraulic fracturing is a vital method for stimulating and enhancing hydrocarbon production, the method's effectiveness can be attenuated by the interaction between the water-based fracturing fluid and formation minerals. In particular, as the fracturing fluid infiltrates the fracture matrix, it can interact with formation minerals to cause the portion of the formation contacting the fracturing fluid to soften. This softening is exhibited by an increase ductility and a reduction in stiffness, hardness, and strength. Further, softening of the exposed formation can result in an increase in creep, which can lead to proppant embedment. In effect, softening of the exposed formation can considerably reduce the size and extent of the fracture matrix and thus reduce effective fracture conductivity. As a result, hydrocarbon production may be considerably reduced. Further, since fracturing fluid causes the softening of the exposed formation, the reduction in conductivity may not be remedied by re-fracturing or multiple fracturing.

The interaction between fracturing fluid and the exposed formation may also limit hydrocarbon production by other mechanisms. Specifically, in many cases, a considerable portion of the fracturing fluid is absorbed into and retained in the exposed formation. The absorption may limit fracture propagation in the pad stage and thereby limit fracture conductivity. Further, the absorbed fracturing fluid can serve as a water block, which can reduce the permeability of the exposed formation to hydrocarbons and thereby reduce hydrocarbon production.

SUMMARY

Due to the reduction in fracture conductivity and hydrocarbon production that can result from the interaction of water-based fracture fluids with the exposed formation, there is a need for compositions and methods that can limit the interaction.

Embodiments of the compositions and methods described herein meet this need through the use of wellbore treatment fluids including hyperbranched amphiphilic copolymers, which may form a protective barrier between the exposed formation and fracturing fluids.

In one or more embodiments, a wellbore treatment fluid is provided. The wellbore treatment fluid may include an aqueous component and an amphiphilic hyperbranched copolymer. The amphiphilic hyperbranched copolymer may include the polymerized reaction product of at least a first monomer and a second monomer. The first monomer may include at least one surface reactive end group chosen from the group consisting of carboxylates, phosphonates, sulfonates, and zwitterions.

In embodiments, a method of modifying surface energy of a subsurface carbonate formation is provided. The method may include injecting a wellbore treatment fluid into a wellbore. The treatment fluid may include an aqueous component and an amphiphilic hyperbranched copolymer. The amphiphilic hyperbranched copolymer may include the polymerized reaction product of at least a first monomer and a second monomer. The first monomer may include at least one surface reactive end group chosen from the group consisting of carboxylates, phosphonates, sulfonates, and zwitterions. The method may further include allowing the treatment fluid to contact the subsurface carbonate formation, thereby modifying the surface energy of the subsurface carbonate formation.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, embodiments of which are illustrated in the accompanying drawings.

DETAILED DESCRIPTION

As used herein, the term "amphiphilic" refers to a molecule containing both hydrophilic and lipophilic moieties.

It was discovered that contacting a subsurface carbonate formation with an aqueous solution of an amphiphilic hyperbranched copolymer may modify the surface energy of the carbonate formation so as to reduce the softening effect from subsequent contact with water compared with not exposing the formation to the amphiphilic hyperbranched copolymer solution. Without intending to be bound by theory, it is believed that contacting the amphiphilic hyperbranched copolymer solution with the carbonate formation results in amphiphilic hyperbranched copolymers forming a protective coating on the formation. In particular, it is believed that because carbonate formations typically exhibit a positive charge, amphiphilic hyperbranched copolymers containing a negative charge form a charge-charge interaction that results in the amphiphilic hyperbranched copolymers forming a coating on the formation. This coating may protect the carbonate formation from interacting with aqueous fluids and thereby lessen the softening of the carbonate formation from subsequent contact with aqueous fluids.

In one or more embodiments, a wellbore treatment fluid is provided. The wellbore treatment fluid may include an aqueous component and an amphiphilic hyperbranched copolymer. The amphiphilic hyperbranched copolymer may include the polymerized reaction product of at least a first monomer and a second monomer. The first monomer may include at least one surface reactive end group chosen from the group consisting of carboxylates, phosphonates, sulfonates, and zwitterions. Without being bound by theory, it is believed that because carboxylates, phosphonates, sulfonates, and zwitterions contain a negative charge, they are able to form a particularly effective charge-charge interaction with a carbonate formation, which is typically positively charged.

According to one or more embodiments, the amphiphilic hyperbranched copolymer may be a linear-hyperbranched block copolymer, a linear-hyperbranched graft copolymer, or a hyperbranched-hyperbranched graft copolymer.

In embodiments, the wellbore treatment fluid may include the amphiphilic hyperbranched copolymer at a concentration of from 0.0001 to 20 wt. %, from 0.0001 to 10 wt. %, from 0.0005 to 10 wt. %, from 0.0005 to 5 wt. %, from 0.001 to 5 wt. %, from 0.001 to 3 wt. %, from 0.001 to 2 wt. %, from 0.002 to 2 wt. %, from 0.005 to 2 wt. %, from 0.005 to 1.5 wt. %, from 0.005 to 1 wt. %, from 0.005 to 0.7 wt. %, from 0.005 wt. % to 0.5 wt. %, from 0.007 to 2 wt. %, from 0.01 to 2 wt. %, from 0.01 to 1.5 wt. %, from 0.01 to 1 wt. %, from 0.01 to 0.5 wt. %, from 0.02 to 0.5 wt. %, from 0.05 to 0.5 wt. %, from 0.1 to 0.5 wt. %, from 0.1 to 0.3 wt. %, or from 0.15 to 0.25 wt. % measured by weight of the wellbore treatment fluid.

In one or more embodiments, the first monomer may form a charge-charge interaction with the carbonate formation and thus anchor the amphiphilic hyperbranched copolymer to the formation surface. Meanwhile, the second monomer, which may be anchored to the formation by the first monomer, may have lipophilic properties that act to protect the carbonate formation from interacting with aqueous fluids and thereby lessen the softening of the carbonate formation from subsequent contact with aqueous fluids.

In embodiments, the first monomer may be chosen from the group consisting of acrylic acid (AA), beta-carboxyethylacrylate (CEA), vinylphosphonic acid (VPA), 2-acrylamido-2-methylpropane sulfonic acid (AMPS), 2-Methyl-2-propene-1-sulfonic acid (MPS), 2-(acrylamido)ethylphosphonic acid, maleic acid, styrene-4-sulfonic acid sodium salt, and adenosine monophosphate.

In one or more embodiments, the second monomer has lipophilic properties and as such, may act to protect the formation from water infiltration. In particular, the second monomer may be chosen from the group consisting of acrylamide, N,N-dimethylacrylamide, (3-acrylamidopropyl) trimethylammonium chloride, 2-hydroxyethyl methacrylate (HEMA), 2-hydroxyethyl acrylate, poly(ethylene glycol) methyl ether acrylate, alkyl acrylate, and lauryl acrylate.

In embodiments, the treatment fluid has a pH ranging from 7.0 to 11.5, from 7.5 to 11.5, from 7.5 to 11, from 8 to 10.5, from 8.5 to 10.5, from 8 to 10, or from 8.5 to 9.5.

In embodiments, the amphiphilic hyperbranched copolymer may include the polymerized reaction product of an Atom Transfer Radical Polymerization (ATRP). In an ATRP, an initiator, which may be an alkyl halide, may be activated by a transition metal complex to generate a radical via a one electron transfer process. In embodiments, the transition metal complex may include a metal and a ligand. In embodiments, the metal may be copper, iron, ruthenium, nickel, or osmium. According to one or more embodiments, the metal may be copper.

According to one or more embodiments, the ligand may include an amine substituent. In embodiments, the ligand may be tris [2-(dimethylamino)ethyl]amine ($Me_6TREN$).

In embodiments, a reducing agent may be included in the reaction mixture to regenerate copper (I) that may have been converted to copper (II). In embodiments, the reducing agent may be a non-radical forming reducing agent. This modification to ATRP is known as activators regenerated by electron transfer (ARGET) ATRP. According to one or more embodiments, the reducing agent may be a hydrazine, a phenol, a sugar, or ascorbic acid.

In embodiments, the radical may propagate with monomers to form the polymer. According to one or more embodiments, the ATRP may be initiated in a solution including an initiator and an inimer. In embodiments, the amphiphilic hyperbranched copolymer may include from 0.5 wt. % to 20 wt. % initiator measured by weight of the amphiphilic hyperbranched copolymer, such as from 0.5 wt. % to 1 wt. %, from 1 wt. % to 2 wt. %, from 2 wt. % to 3 wt. %, from 3 wt. % to 6 wt. %, from 6 wt. % to 10 wt. %, from 10 wt. % to 12 wt. %, from 12 wt. % to 16 wt. %, from 16 wt. % to 19 wt. %, from 19 wt. % to 20 wt. %, or any combination of ranges or smaller range therein. The amphiphilic hyperbranched copolymer may also include from 2 wt. % to 20 wt. % inimer measured by weight of the amphiphilic hyperbranched copolymer, such as from 2 wt. % to 3 wt. %, from 3 wt. % to 6 wt. %, from 6 wt. % to 10 wt. %, from 10 wt. % to 12 wt. % from 12 wt. % to 16 wt. %, from 16 wt. % to 19 wt. %, from 19 wt. % to 20 wt. %, or any combination of ranges or smaller range therein.

In embodiments, the initiator may include ethyl 2-bromoisobutyrate, and the inimer may include 2-(2-bromoisobutyryloxy)ethyl methacrylate. In embodiments, the initiator may also or alternatively include ethyl 2-bromoisobutyrate, 2-hydroxyethyl 2-bromoisobutyrate, dodecyl 2-bromoisobutyrate, or combinations thereof. The inimer may include 2-(2-bromoisobutyryloxy)ethyl methacrylate, or any double carbon-bonded equivalent of the previous initiators, including but not limited to 10-undecenyl 2-bromoisobutyrate or 2-(2-bromoisobutyryloxy)ethyl acrylate.

Without being limited by theory, the initiator may initiate polymer chain growth for the amphiphilic hyperbranched copolymer. The inimer may in contrast be part of the polymer chain itself, as well as also having an initiator function, such as activation by the transition metal complex previously discussed for the initiator. Accordingly, the initiator may contribute to an initial branching of the copolymer, whereas the inimer may contribute to the hyperbranching off the initial branching of the copolymer.

In embodiments, the amphiphilic hyperbranched copolymer may include from 20 wt. % to 80 wt. % first monomer, measured by weight of the amphiphilic hyperbranched copolymer, such as from 20 wt. % to 22 wt. %, from 22 wt. % to 30 wt. %, from 30 wt. % to 40 wt. %, from 40 wt. % to 50 wt. % from 50 wt. % to 60 wt. %, from 60 wt. % to 70 wt. %, from 70 wt. % to 78 wt. %, from 78 wt. % to 80 wt. %, or any combination of ranges or smaller range therein.

According to one or more embodiments, the amphiphilic hyperbranched copolymer may include from 1 wt. % to 78 wt. % second monomer, measured by weight of the amphiphilic hyperbranched copolymer, such as from 1 wt. % to 2 wt. %, from 2 wt. % to 10 wt. %, from 10 wt. % to 20 wt. %, from 20 wt. % to 40 wt. % from 40 wt. % to 60 wt. %, from 60 wt. % to 70 wt. %, from 70 wt. % to 75 wt. %, from 75 wt. % to 78 wt. %, or any combination of ranges or smaller range therein.

In embodiments, the first monomer may be 2-acrylamido-2-methylpropane sulfonic acid and the second monomer may be chosen from the group consisting of 2-hydroxyethyl methacrylate and acrylamide. In embodiments, the amphiphilic hyperbranched copolymer may include the polymerized reaction product of at least 2-acrylamido-2-methylpropane sulfonic acid, 2-hydroxyethyl methacrylate, and acrylamide.

In embodiments, the wellbore treatment fluid may include a surfactant. According to one or more embodiments, the wellbore treatment fluid may include an anionic surfactant. Without being bound by theory, it is believed that anionic surfactants may also form a protective coating on the surface of a carbonate formation. In particular, it is believed that because carbonate formations typically exhibit a positive charge, anionic surfactants may form a charge-charge interaction that results in the anionic surfactants forming a coating on the formation. This coating may protect the carbonate formation from interacting with aqueous fluids and thereby lessen the softening of the carbonate formation from subsequent contact with aqueous fluids. In embodiments, a wellbore treatment fluid including both an amphiphilic hyperbranched copolymer and an anionic surfactant may form a superior protective coating on a carbonate formation to a wellbore treatment fluid without an anionic surfactant.

According to one or more embodiments, the anionic surfactant may include a sulfate, sulfonate, or carboxylate. In embodiments, the anionic surfactant may be sodium decyl sulfate, sodium dodecyl sulfonate, sodium N-lauroyl-N-methyltaurate, sodium tetradecyl sulfate, sodium dodecyl sulfate (SDS), ammonium lauryl sulfate, sodium laureth sulfate, sodium lauryl sarcosinate, sodium myreth sulfate, sodium pareth sulfate, sodium stearate, sodium lauryl sulfate, α-olefin sulfonate, ammonium laureth sulfate, sodium dodecylbenzenesulfonate, and sodium dialkylsulfosuccinate. According to one or more embodiments, the anionic surfactant may be fluorinated. In embodiments, the anionic surfactant may be ammonium perfluorooctanoate or sodium 2-(perfluorohexyl)ethane-1-sulfonate.

In embodiments, the wellbore treatment fluid may include the anionic surfactant at a concentration of from 0.0001 to 20 wt. %, from 0.0001 to 10 wt. %, from 0.0005 to 10 wt. %, from 0.0005 to 5 wt. %, from 0.001 to 5 wt. %, from 0.001 to 3 wt. %, from 0.001 to 2 wt. %, from 0.002 to 2 wt. %, from 0.005 to 2 wt. %, from 0.005 to 1.5 wt. %, from 0.005 to 1 wt. %, from 0.005 to 0.7 wt. %, from 0.005 wt. % to 0.5 wt. %, from 0.007 to 2 wt. %, from 0.01 to 2 wt. %, from 0.01 to 1.5 wt. %, from 0.01 to 1 wt. %, from 0.01 to 0.5 wt. %, from 0.02 to 0.5 wt. %, from 0.05 to 0.5 wt. %, from 0.1 to 0.5 wt. %, from 0.1 to 0.3 wt. %, or from 0.15 to 0.25 wt. % measured by weight of the wellbore treatment fluid.

In embodiments, the wellbore treatment fluid further may include at least one or more additives chosen from the group consisting of weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof.

In embodiments, the wellbore treatment fluid further may include a polyacrylamide. In one or more embodiments, the wellbore treatment fluid may include a linear polysaccharide. According to one or more embodiments, the wellbore treatment may include a biocide. In embodiments, the wellbore treatment fluid may include a scale control chemical such as a phosphonate or ethylene glycol.

According to one or more embodiments, the wellbore treatment fluid has a dynamic viscosity range of from 0.1 to 10,000 centipoise (cP), where the dynamic viscosity may be calculated by dividing the shear stress by the rate of shear strain. One cP is equivalent to one millipascal-second (mPa·s). In embodiments, the wellbore treatment fluid has a dynamic viscosity range of from 0.2 to 5,000 cP, from 0.3 to 4,000 cP, from 0.5 to 3,000 cP, from 0.5 to 2,000 cP, from 0.5 to 1,500 cP, from 0.5 to 1,000 cP, from 0.5 to 750 cP, from 1 to 750 cP, from 1 to 600 cP, from 1 to 500 cP, from 2 to 500 cP, from 2 to 450 cP, from 2 to 400 cP, or from 3 to 300 cP.

In embodiments, a method of modifying surface energy of a subsurface carbonate formation may also be provided. The method may include injecting a wellbore treatment fluid into a wellbore. The treatment fluid may include an aqueous component and an amphiphilic hyperbranched copolymer. The amphiphilic hyperbranched copolymer may include the polymerized reaction product of at least a first monomer and a second monomer. The first monomer may include at least one surface reactive end group chosen from the group consisting of carboxylates, phosphonates, sulfonates, and zwitterions. The method may further include allowing the treatment fluid to contact the subsurface carbonate formation, thereby modifying the surface energy of the subsurface carbonate formation.

In embodiments, the method may further include reducing water penetration into the subsurface carbonate formation due to modifying the surface energy of the subsurface carbonate formation. According to one or more embodiments, a depth of the water penetration may be reduced by at least 1%, at least 2%, at least 3%, at least 4%, at least 5%, at least 6%, at least 7%, at least 8%, at least 9%, at least 10%, at least 11%, at least 12%, at least 15%, at least 20%, or even at least 25%.

In embodiments, the method may be used in a hydraulic fracturing process to increase fracture conductivity and hydrocarbon production. In embodiments, the wellbore treatment fluid may be introduced during the pad stage of a hydraulic fracturing process. In other embodiments, the wellbore treatment fluid may be introduced prior to the pad stage of a hydraulic fracturing process. According to one or more embodiments, the wellbore treatment may not be introduced during the slurry stage of a hydraulic fracturing process.

EXAMPLES

Using embodiments described above, mechanical properties of a shale sample directly treated with deionized (DI) water was compared with a shale sample treated with an exemplary aqueous amphiphilic hyperbranched copolymer solution and then subsequently treated with DI water. The examples are illustrative in nature, and should not be understood to limit the subject matter of the present disclosure.

Testing Protocol

In all examples, an Outcrop Eagle Ford Shale core plug sample with a 1" diameter and a length of 0.5" was fine trimmed using a target surface trimmer and polished using an Allied High Tech Multiprep surface polisher with abrasive discs.

The rock was labeled with 2 centimeter tape at the bottom and the point 3 millimeters (mm) from the left of the tape was marked as x=0. The rock was fixed on the stage so that the straight line of the label was parallel with the y direction of the stage. The microindentation instrument used was Nanovea PB1000. The measure area was outlined with the indenter tip, and the area was mapped with 25 points with the interval between each being 0.1 mm. During the mapping process, the instrument measures several mechanical properties.

Figure 1:
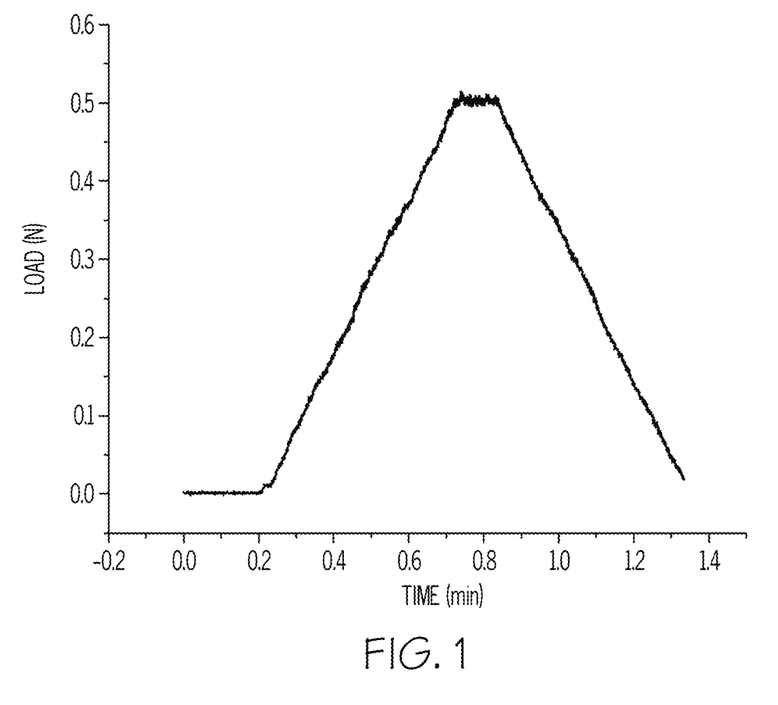
FIG. 1 depicts a loading protocol of a microindentation instrument according to embodiments described herein.

For the single load microindentation, the maximum load was 0.5 Newtons (N). The loading and unloading rate were both 1 Newton/minute (N/min). When the instrument reaches the maximum load, the creep time is 7 s (FIG. 1).

Comparative Example 1: Treatment of Shale Sample with Deionized Water

A fresh shale sample was mapped with the microindentation instrument. The data collected from the mapping was designated as "untreated." Then the entire shale sample was submerged in DI water for 2 hours. Afterwards, the shale sample was mapped a second time with the microindentation instrument, with the second mapping being diagonally adjacent to the first mapping. The data collected from the second mapping was designated as "direct DI water treated."

Figure 2A:
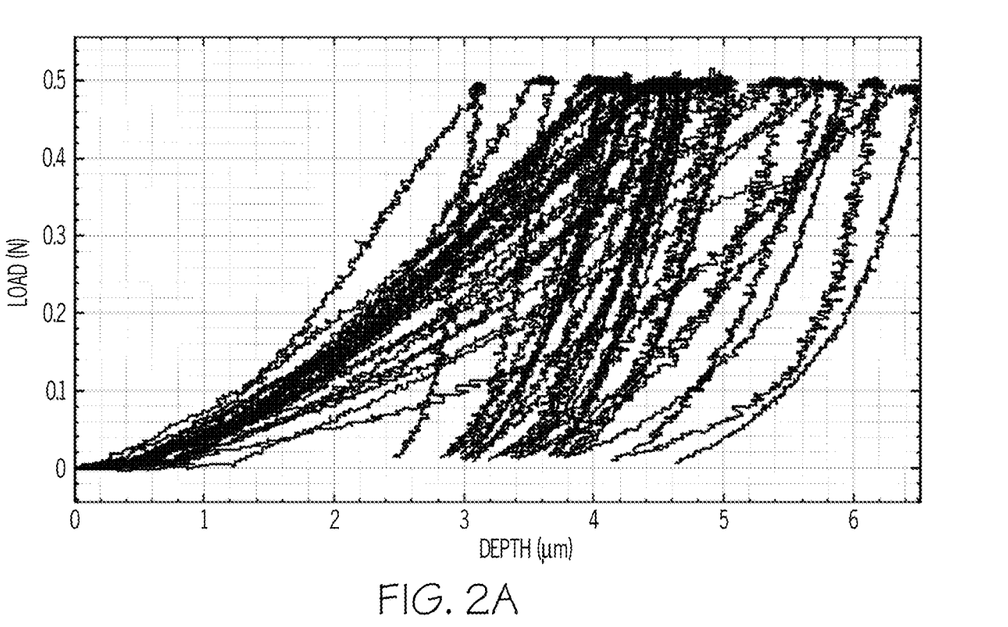
FIG. 2A depicts a load-depth curve of an untreated shale sample according to embodiments described herein.
Figure 2B:
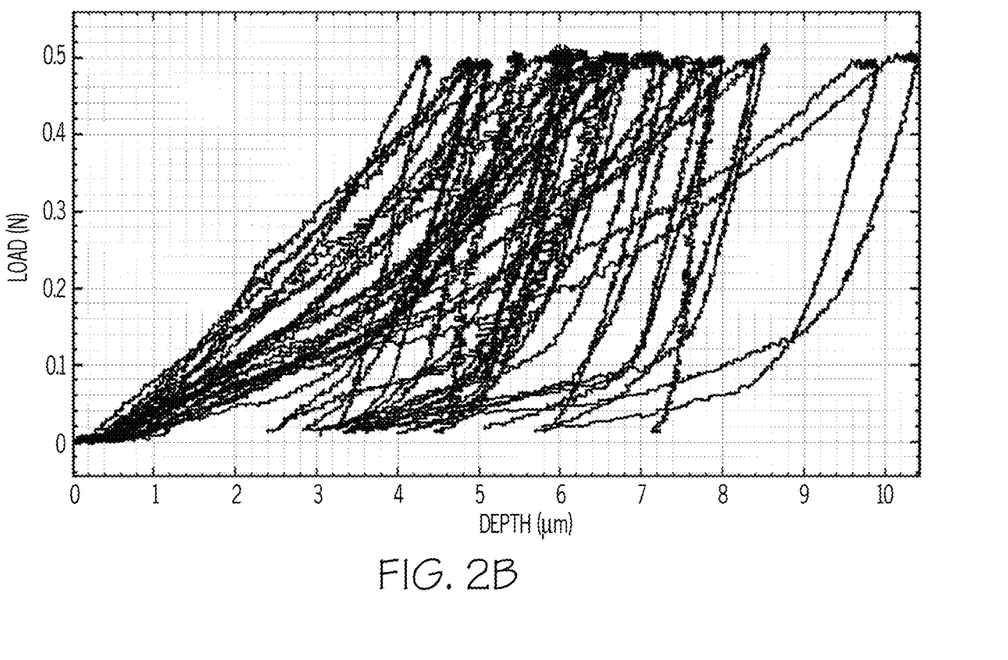
FIG. 2B depicts a load-depth curve of a shale sample directly treated with deionized (DI) water according to embodiments described herein.

The load-depth curve of the shale sample in Comparative Example 1 is shown in FIG. 2A (untreated—from 0 μm to 6.5 μm) and FIG. 2B (direct DI water treated—from 0 μm to 10.5 μm). The depth at the load of 0.5 N ranges from 2.9 μm to 6.6 μm for the untreated sample while the depth ranges from 4.4 μm to 10.4 μm for the direct DI water treated sample. The depth is deeper in general after direct DI water treatment, which indicates a softening effect by DI water treatment.

Table 1 compares the mechanical properties of the untreated sample with the direct DI water treated sample. The rock sample is substantially softened after DI water treatment as evidenced by the over 40% increase in max depth and approximately 30% decrease in hardness.

TABLE 1

Mechanical Properties of Shale Sample for Comparative Example 1

| | | Max Depth (nm) | Hardness (MPa) |
|---|---|---|---|
| Untreated | Average | 4600 | 11.36 |
| | Standard Deviation | 762 | 44.83 |
| Direct DI Water Treated | Average | 6554 | 7.96 |
| | Standard Deviation | 1427 | 17.34 |

Hardness was calculated using Equations I through III below, where $d_{avg}$ denotes the average diameter of the indented surface, A denotes the surface area of the indented surface, F denotes the indentation force applied, t denotes the depth of the indentation, and $\theta$ denotes the cross-sectional angle across the indentation.

$$d_{avg} = 2\sqrt{2}\tan\frac{\theta}{2}t \approx 7.0006t \qquad (I)$$

$$A = \frac{d_{avg}^2}{2\sin(136°/2)} \approx 26.4287t^2 \qquad (II)$$

$$\text{Hardness}\left(\frac{N}{mm^2}\right) \text{ or (MPa)} = \frac{F}{A} \approx 3.3854*10^{-3}*\frac{F}{t^2} \qquad (III)$$

Elastic modulus was calculated according to such methods found in Shuman, et al, "Calculating the elastic modulus from nanoindentation and microindentation reload curves," Materials Characterization 58 (2007) 380-389, particularly utilizing the Oliver-Pharr method.

Example 1: Treatment of Shale Sample with Amphiphilic Copolymer Solution Followed by De-Ionized Water Preparation of Amphiphilic Hyperbranched Copolymer 1

Amphiphilic Hyperbranched Copolymer 1 (AHC 1), including the formula poly(AMPS-r-HEMA-r-AAm) was prepared by atom transfer radical polymerization (ATRP) using the following procedure.

Copper (II) bromide (99%, Aldrich, 22.3 mg, 0.1 mmol) and Tris [2-(dimethylamino)ethyl]amine (Me$_6$TREN, 97%, Aldrich, 264 μL, 1 mmol) were dissolved in 5 mL dimethylformamide (DMF, Fisher Chemical), and the resulting solution was designated as mixture A.

Separately, solutions of each monomer were prepared. Specifically, sodium 2-acrylamido-2-methyl-1-propane-sulfonic acid (Na-AMPS, prepared by reacting AMPS with sodium hydroxide, 4.585 g) was dissolved in 10 mL DMF/H$_2$O (50/50 v/v) to make a 2M Na-AMPS solution; 2-hydroxyethyl methacrylate (HEMA, 97%, Aldrich, 2.602 g) was dissolved in 10 mL DMF/H$_2$O (50/50 v/v) to make a 2M HEMA solution; and acrylamide (AAm, ≥98.0% (GC), Aldrich, 2.5 g) was dissolved in 10 mL DMF/H$_2$O (50/50 v/v) to make a 3.5M AAm solution. All monomer solutions were purged with nitrogen separately through a Schlenk line.

5 mL of the 2M Na-AMPS solution was mixed with ethyl α-bromoisobutyrate (EBiB, 98%, Aldrich, 73.4 μL, 0.50 mmol), 2-(2-bromoisobutyryloxy)ethyl methacrylate (BrMA, 95%, Aldrich, 0.321 ml, 1.5 mmol), L-ascorbic acid (L-AA, 99%, Aldrich, 3.75 mL of a 0.01 M solution, 0.0375 mmol), and the resulting mixture was diluted with 5 mL DMF/H$_2$O (50/50 v/v) and designated as mixture B.

Mixtures A and B were purged with nitrogen for 30 min. Mixture B was then heated to 50° C. in an oil bath and mixture A (37.5 µL) was added to mixture B, which initiated polymerization. After 30 minutes, the 2M HEMA solution (5 mL) was added into the reaction mixture. After 5 hours, the 3.5M AAm solution (2.84 mL) was added to the reaction mixture. After 16 hours, the reaction mixture was cooled to room temperature and exposed to air. The reaction mixture was then diluted with DMF and dialyzed in DMF for 1 day and then water another day. AHC 1 was isolated by freeze-drying the solution.

Microindentation of Shale Sample

A fresh shale sample was mapped with the microindentation instrument. The data collected from the mapping was designated as "untreated." Then the entire shale sample was submerged in a solution of DI water containing 0.02 wt. % AHC 1. Afterwards, the shale sample was mapped a second time with the microindentation instrument, with the second mapping being diagonally adjacent to the first mapping. The data collected from the second mapping was designated as "AHC 1 treated." Then the entire shale sample was submerged in DI water for 2 hours. Afterwards, the shale sample was mapped a third time with the microindentation instrument, with the third mapping being diagonally adjacent to the second mapping. The data collected from the third mapping was designated as "Subsequent DI water treatment."

Figure 3A:
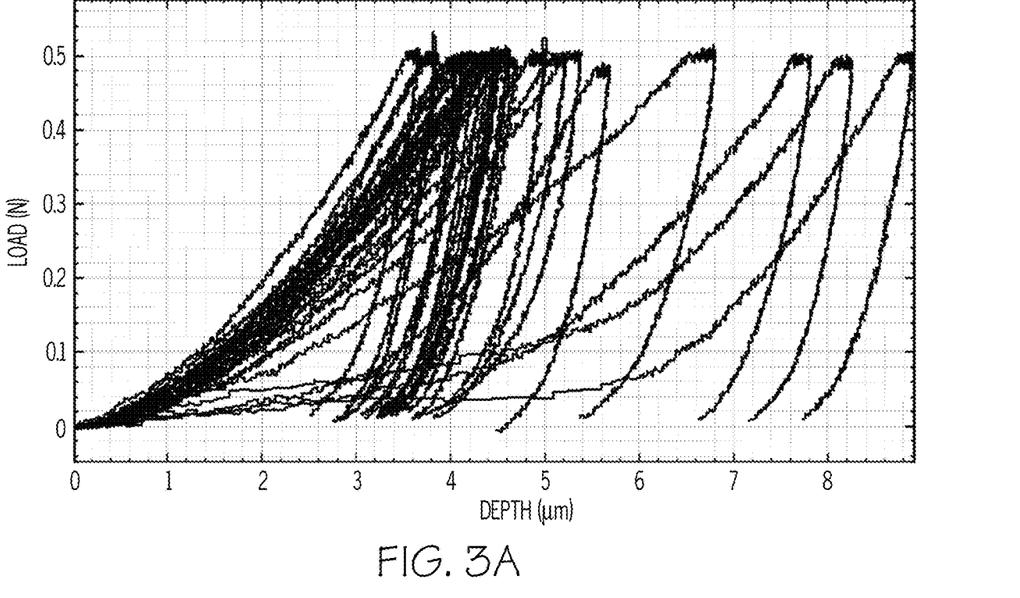
FIG. 3A depicts a load-depth curve of an untreated shale sample according to embodiments described herein.
Figure 3B:
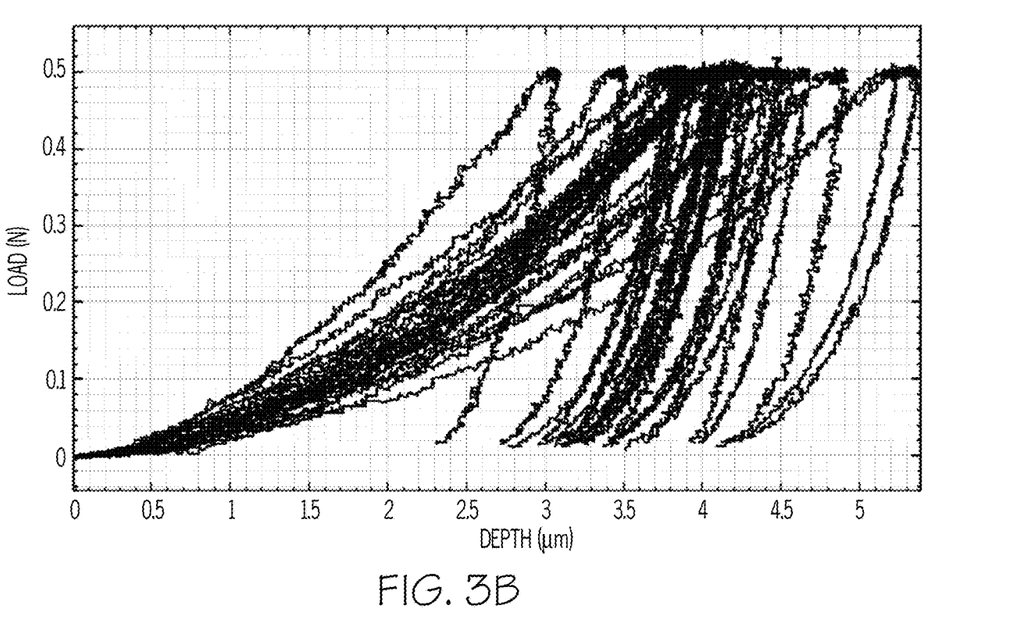
FIG. 3B depicts a load-depth curve of a shale sample treated with a solution of an amphiphilic hyperbranched copolymer in deionized (DI) water according to embodiments described herein.
Figure 3C:
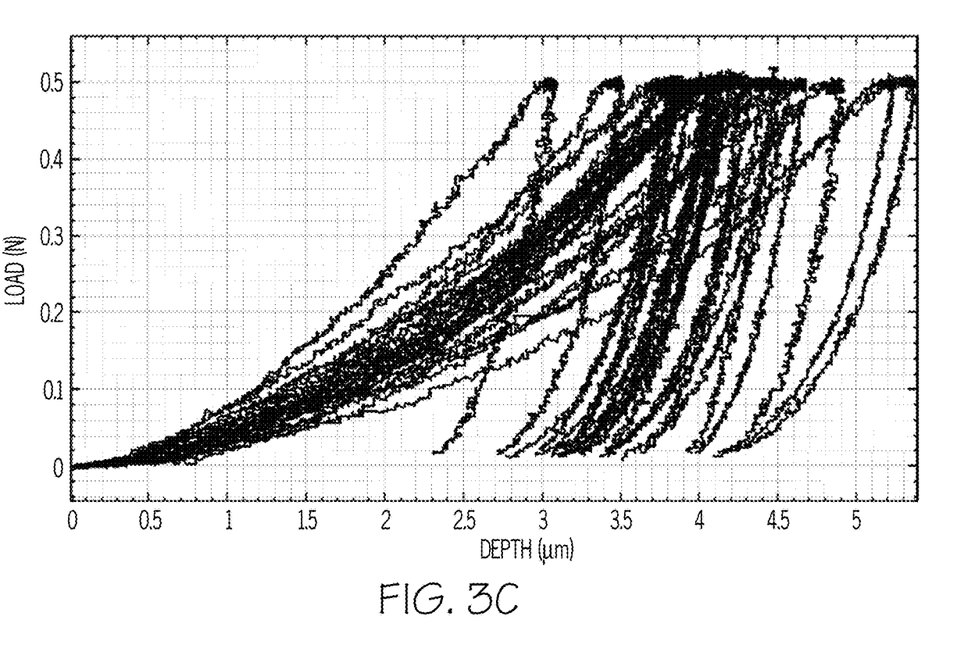
FIG. 3C depicts a load-depth curve of a shale sample treated with deionized (DI) water subsequent to the amphiphilic hyperbranched copolymer solution according to embodiments described herein.

The load-depth curve of the shale sample in Example 1 is shown in FIG. 3A (untreated—from 0 µm to approximately 9 µm), FIG. 3B (AHC 1 treated—from 0 µm to approximately 5.5 µm), and FIG. 3C (subsequent DI water treatment—from 0 µm to approximately 5.5 µm). The depth at the load of 0.5 N ranges from 3.5 µm to 9.0 µm for the untreated sample, the depth ranges from 3.0 µm to 5.8 µm for the AHC 1 treated sample, and the depth ranges from 3.2 µm to 4.8 µm (other than an outlier at 1.8 µm) for the subsequent DI water treated sample. As evidenced by the max depth, on average, staying the same or lessened after AHC 1 treatment and subsequent DI water treatment, the shale sample exhibits much less softening when treated with DI water after being first treated with the AHC 1 solution compared with being directly treated with DI water.

Table 2 compares the mechanical properties of the untreated sample, the AHC 1 treated sample, and the subsequent DI water treated sample. As shown in Table 2, the max depth and the mechanical properties of the rock samples change to a much smaller degree for Example 1 as compared to Comparative Example 1. Therefore, the shale sample in Example 1, which was treated first with AHC 1 before being treated with DI water, exhibits much less softening than the shale sample in Comparative Example 1, which was directly treated with DI water.

TABLE 2

Mechanical Properties of Shale Sample for Example 1 vs. Comparative Example 1

|  |  | Max Depth (nm) | Hardness (MPa) |
|---|---|---|---|
| Example 1 | | | |
| Untreated | Average | 4875 | 1.24 |
|  | Standard Deviation | 1360 | 0.47 |
| AHC 1 Treated | Average | 4067 | 1.56 |
|  | Standard Deviation | 477 | 0.43 |
| Subsequent DI Water Treatment | Average | 3613 | 2.22 |
|  | Standard Deviation | 489 | 1.82 |

TABLE 2-continued

Mechanical Properties of Shale Sample for Example 1 vs. Comparative Example 1

|  |  | Max Depth (nm) | Hardness (MPa) |
|---|---|---|---|
| Comparative Example 1 | | | |
| Untreated | Average | 4600 | 11.36 |
|  | Standard Deviation | 762 | 44.83 |
| Direct DI Water Treated | Average | 6554 | 7.96 |
|  | Standard Deviation | 1427 | 17.34 |

It should be understood that any ranges provided herein include the endpoints unless stated otherwise.

It should be understood that any two quantitative values assigned to a property may constitute a range of that property, and all combinations of ranges formed from all stated quantitative values of a given property are contemplated in this disclosure.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A wellbore treatment fluid comprising:
   an aqueous component; and
   an amphiphilic hyperbranched copolymer comprising a polymerized reaction product of at least a first monomer and a second monomer, wherein
   the amphiphilic hyperbranched copolymer is a linear-hyperbranched block copolymer, a linear-hyperbranched graft copolymer, or a hyperbranched-hyperbranched graft copolymer,
   the first monomer comprises at least one surface reactive end group chosen from the group consisting of carboxylates, phosphonates, sulfonates, and zwitterions,
   the second monomer comprises 2-hydroxyethyl methacrylate and acrylamide, and
   the amphiphilic hyperbranched copolymer comprises 1 wt. % to 80 wt. % of the first monomer.

2. The wellbore treatment fluid of claim 1, wherein the wellbore treatment fluid comprises from 0.001 to 2 wt. % of the amphiphilic hyperbranched copolymer.

3. The wellbore treatment fluid of claim 1, wherein the wellbore treatment fluid further comprises an anionic surfactant.

4. The wellbore treatment fluid of claim 1, wherein the amphiphilic hyperbranched copolymer comprises the polymerized reaction product of an Atom Transfer Radical Polymerization (ATRP), where the ATRP is initiated in a solution comprising an initiator and an inimer.

5. The wellbore treatment fluid of claim 4, wherein:
   the initiator comprises ethyl 2-bromoisobutyrate, 2-hydroxyethyl 2-bromoisobutyrate, dodecyl 2-bromoisobutyrate, or combinations thereof; and
   the inimer comprises 2-(2-bromoisobutyryloxy) ethyl methacrylate, 10-undecenyl 2-bromoisobutyrate or 2-(2-bromoisobutyryloxy) ethyl acrylate, or combinations thereof.

6. The wellbore treatment fluid of claim 1, wherein the first monomer is chosen from the group consisting of acrylic acid (AA), beta-carboxyethylacrylate (CEA), vinylphosphonic acid (VPA), 2-acrylamido-2-methylpropane sulfonic acid (AMPS), 2-Methyl-2-propene-1-sulfonic acid (MPS), 2-(acrylamido) ethylphosphonic acid, maleic acid, styrene-4-sulfonic acid sodium salt, and adenosine monophosphate.

7. The wellbore treatment fluid of claim 1, wherein the wellbore treatment fluid has a pH ranging from 7.0 to 11.5.

8. The wellbore treatment fluid of claim 1, wherein the first monomer is 2-acrylamido-2-methylpropane sulfonic acid.

9. The wellbore treatment fluid of claim 1, wherein the amphiphilic hyperbranched copolymer comprises the polymerized reaction product of at least 2-acrylamido-2-methylpropane sulfonic acid, 2-hydroxyethyl methacrylate, and acrylamide.

10. The wellbore treatment fluid of claim 1, further comprising at least one or more additives chosen from the group consisting of weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof.

11. A method of modifying surface energy of a subsurface carbonate formation comprising:
injecting a wellbore treatment fluid into a wellbore, the wellbore treatment fluid comprising:
an aqueous component; and
an amphiphilic hyperbranched copolymer comprising a polymerized reaction product of at least a first monomer and a second monomer, wherein
the amphiphilic hyperbranched copolymer is a linear-hyperbranched block copolymer, linear-hyperbranched graft copolymer, or a hyperbranched-hyperbranched graft copolymer,
the first monomer comprises at least one surface reactive end group chosen from the group consisting of carboxylates, phosphonates, sulfonates, and zwitterions,
the second monomer comprises 2-hydroxyethyl methacrylate and acrylamide, and
the amphiphilic hyperbranched copolymer comprises 1 wt. % to 80 wt. % of the first monomer; and
allowing the treatment fluid to contact the subsurface carbonate formation, thereby modifying the surface energy of the subsurface carbonate formation.

12. The method of claim 11, further comprising reducing water penetration into the subsurface carbonate formation due to modifying the surface energy of the subsurface carbonate formation.

13. The method of claim 12, wherein a depth of the water penetration is reduced by at least 15%.

14. The method of claim 11, wherein the wellbore treatment fluid comprises from 0.001 to 2 wt. % of the amphiphilic hyperbranched copolymer.

15. The method of claim 11, wherein the first monomer is chosen from the group consisting of acrylic acid (AA), beta-carboxyethylacrylate (CEA), vinylphosphonic acid (VPA), 2-acrylamido-2-methylpropane sulfonic acid (AMPS), 2-Methyl-2-propene-1-sulfonic acid (MPS), 2-(acrylamido) ethylphosphonic acid, maleic acid, styrene-4-sulfonic acid sodium salt, and adenosine monophosphate.

16. The method of claim 11, wherein the first monomer is 2-acrylamido-2-methylpropane sulfonic acid.

17. The method of claim 11, wherein the amphiphilic hyperbranched copolymer comprises the polymerized reaction product of at least 2-acrylamido-2-methylpropane sulfonic acid, 2-hydroxyethyl methacrylate, and acrylamide.

* * * * *